United States Patent
Li et al.

(10) Patent No.: US 9,882,464 B1
(45) Date of Patent: Jan. 30, 2018

(54) SYSTEM FOR FILTERING HIGH FREQUENCY NOISE COMPONENTS AND AN ASSOCIATED METHOD THEREOF

(71) Applicant: General Electric Company, Schenectady, NY (US)

(72) Inventors: Cong Li, Niskayuna, NY (US); Ruxi Wang, Cohoes, NY (US); Juan Antonio Sabate, Gansevoort, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/375,427

(22) Filed: Dec. 12, 2016

(51) Int. Cl.
*H02M 1/12* (2006.01)
*H02M 7/44* (2006.01)

(52) U.S. Cl.
CPC ............. *H02M 1/126* (2013.01); *H02M 7/44* (2013.01); *H02M 2001/123* (2013.01)

(58) Field of Classification Search
CPC .... H02M 7/219; H02M 1/4208; H02M 7/483; H02M 7/72; H02M 1/12; Y02E 10/56; Y10T 29/49117
USPC ........................ 363/16–20, 34–41, 127, 132; 323/207–211; 307/105, 106
See application file for complete search history.

(56) References Cited

U.S. PATENT DOCUMENTS

| | | | |
|---|---|---|---|
| 5,757,099 | A | 5/1998 | Cheng et al. |
| 8,502,539 | B2 | 8/2013 | Lai et al. |
| 2007/0147098 | A1 | 6/2007 | Mori et al. |
| 2013/0162250 | A1 | 6/2013 | Sabate et al. |

FOREIGN PATENT DOCUMENTS

| | | |
|---|---|---|
| CN | 201345544 Y | 11/2009 |
| CN | 102570465 A | 7/2012 |
| CN | 202712854 U | 1/2013 |
| CN | 103731015 A | 4/2014 |
| CN | 104950273 A | 9/2015 |
| WO | 2016075076 A1 | 5/2016 |

OTHER PUBLICATIONS

Ramirez et al., "Harmonic Compensation in the AC Mains by the Use of Current and Voltage Active Filters Controlled by a Passivity-Based Law", Power Electronics Congress, 2000. CIEP 2000. VII IEEE International, pp. 87-92, 2000.
Chow et al., "Design and Evaluation of a Hybrid Passive/Active Ripple Filter with Voltage Injection", IEEE Transactions on Aerospace and Electronic Systems, vol. 39, Issue 2, pp. 471-480, Apr. 2003.

(Continued)

*Primary Examiner* — Rajnikant Patel
(74) *Attorney, Agent, or Firm* — Pabitra K. Chakrabarti

(57) ABSTRACT

A system including at least one first converter and a filtering unit coupled to the at least one first converter is presented. The filtering unit includes at least one second converter and a plurality of inductors coupled to the at least one second converter. The system further includes a controlling unit operatively coupled to the at least one first converter and the at least one second converter. The controlling unit switches the at least one first converter to generate a first output voltage and the at least one second converter to generate a second output voltage, where the first output voltage and the second output voltage have a substantially same switching pattern.

22 Claims, 11 Drawing Sheets

(56) References Cited

OTHER PUBLICATIONS

Daniel et al., "Harmonic Voltage Compensation for Single Phase Power Systems", European Control Conference (ECC), 2003, pp. 1899-1904, Sep. 1-4, 2003.
Mini et al., "Active LC Clamp dv/dt Filter for Voltage Reflection due to Long Cable in Induction Motor Drives", International Journal of Electrical and Computer Engineering (IJECE), vol. 6, Issue 4, http://iaesjournal.com/online/index.php/IJECE/article/view/9156, 14 pages.
Wang et al., "Technical Approach", Schneider Electric team, pp. 1-7, https://www.littleboxchallenge.com/pdf/finalists/57137-Tech.pdf, Oct. 2015.

SYSTEM FOR FILTERING HIGH FREQUENCY NOISE COMPONENTS AND AN ASSOCIATED METHOD THEREOF

BACKGROUND

Embodiments of the present invention generally relate to filtering systems and more specifically to a system and method for filtering high frequency noise components generated by a power conversion unit.

Currently, output of pulse width modulated (PWM) power converters include large amount of high frequency noise components. It is undesirable to transfer the high frequency noise components to a load such as a motor, an inductive load, cable, or the like. In long cables, the high frequency noise components generate undesirable high amplitude voltage waves across the cables. Furthermore, in motors and inductive loads, the high frequency noise components cause stress in the insulations and generate high frequency leakage currents. In magnetic resonance imaging (MRI) devices, where the inductive loads such as gradient coils are excited by a gradient amplifier, the high frequency noise components affect the quality of an acquired image.

Traditionally, a passive filter is employed to filter the high frequency noise components. The passive filers use inductors, damping resistors, and capacitors. The passive filter is bulky due to the use of inductors, damping resistors, and capacitors. Further, the damping resistors introduce high losses. Furthermore, the passive filter is typically designed for a fixed value of frequency. Hence, use of such a passive filter to filter high frequency noise components having a plurality of frequencies is not feasible without further increasing footprint of the filter.

Accordingly, there is a need for an enhanced system and method for filtering high frequency noise components.

BRIEF DESCRIPTION

In accordance with one embodiment of the present invention, a system including at least one first converter and a filtering unit coupled to the at least one first converter is disclosed. The filtering unit includes at least one second converter and a plurality of inductors coupled to the at least one second converter. The system further includes a controlling unit operatively coupled to the at least one first converter and the at least one second converter. The controlling unit switches the at least one first converter to generate a first output voltage and the at least one second converter to generate a second output voltage, where the first output voltage and the second output voltage have a substantially same switching pattern.

In accordance with another embodiment of the present invention, an imaging system is disclosed. The imaging system includes a gradient amplifier including at least one first converter. The imaging system further includes a filtering unit coupled to the at least one first converter. The filtering unit includes at least one second converter and a plurality of inductors coupled to the at least one second converter. The imaging system also includes a gradient coil coupled to the gradient amplifier via the filtering unit. Further, the imaging system includes a controlling unit. The controlling unit is operatively coupled to the at least one first converter and the at least one second converter and switches the at least one first converter to generate a first output voltage and the at least one second converter to generate a second output voltage. The first output voltage and the second output voltage have a substantially same switching pattern.

In accordance with yet another embodiment of the present invention, a method is disclosed. The method includes switching, using a controlling unit, at least one first converter and at least one second converter of a filtering unit to generate a first output voltage and a second output voltage respectively. The first output voltage and the second output voltage have a substantially same switching pattern. The filtering unit includes a plurality of inductors coupled to the at least one second converter. Further, the method includes generating a filtering component, using the filtering unit, based on the generated second output voltage. Furthermore, the method includes subtracting the filtering component from the generated first output voltage. Further, the method includes generating a filtered electrical output based on the subtraction of the filtering component from the generated first output voltage and providing the filtered electrical output to a load operatively coupled to the at least one first converter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
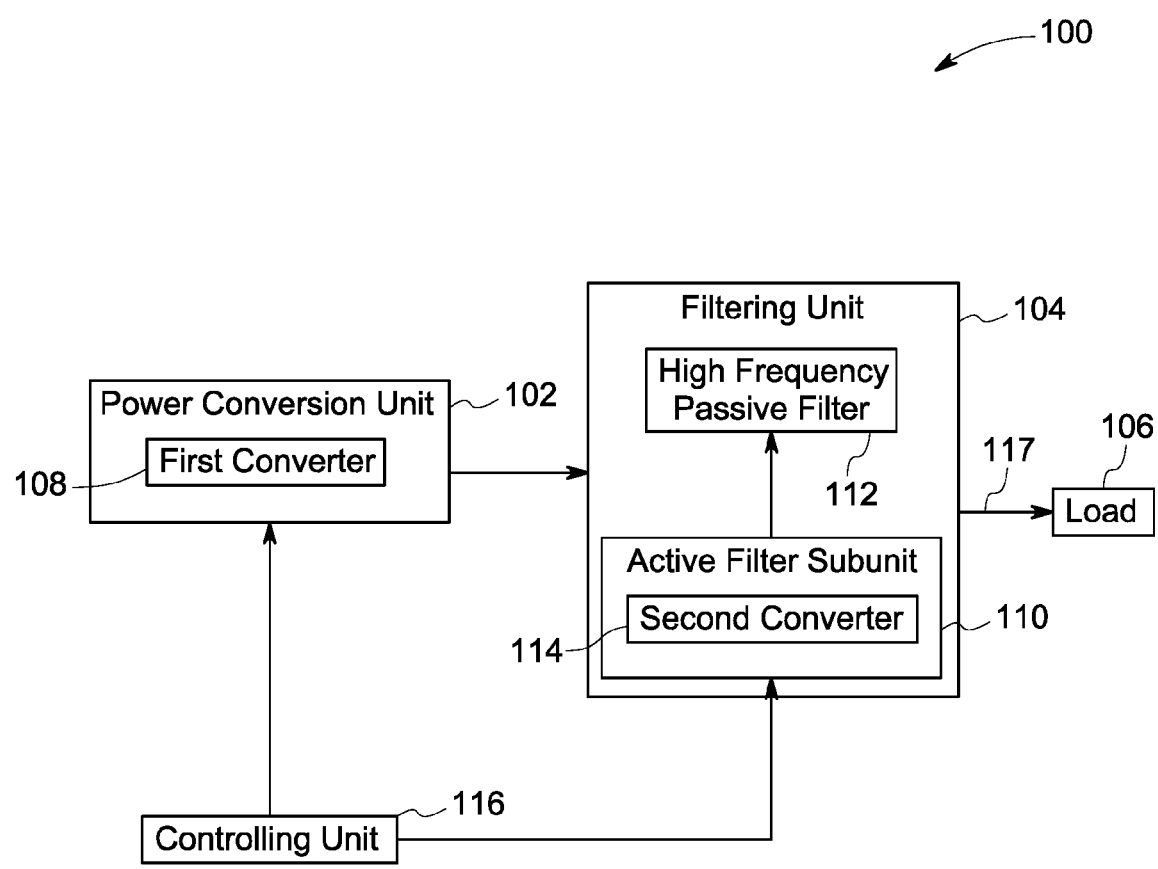
FIG. 1 is a block diagram of a system used for filtering high frequency noise components generated by a power conversion unit in accordance with certain embodiments of the present invention.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "controlling unit" may include either a single component or a plurality of components, which are either active and/or passive and are connected or otherwise coupled together to provide the described function. In addition, the term operatively coupled as used herein includes wired coupling, wireless coupling, electrical coupling, magnetic coupling, radio communication, software based communication, or combinations thereof.

As will be described in detail hereinafter, various embodiments of an exemplary filtering system and an exemplary method of operating the filtering system are disclosed. Specifically, embodiments of an active filter for reducing high frequency noise components such as common mode dv/dt and differential mode dv/dt noise components generated by inverters/power converters are disclosed. The exemplary filtering system may be used along with any power conversion unit to filter high frequency noise components from an output generated by the power conversion unit. In one embodiment, the high frequency noise components may range from about few kilohertz (kHz) to about few megahertz (MHz). In one embodiment, the power conversion unit includes a pulse width modulated (PWM) converter. In another embodiment, the power conversion unit includes an amplifier stage of a gradient unit of a magnetic resonance imaging (MRI) device. Alternatively, the amplifier stage may include one or more PWM converters.

Furthermore, the system includes a filtering unit coupled to a power conversion unit. The filtering unit includes a converter. In one embodiment, the filtering unit is an active filter. The converters of the filtering unit and the power conversion unit are switched to generate corresponding output voltages having substantially same switching pattern. In one embodiment, switching units of the converter of the filtering unit and switching units of the power conversion unit are switched based on a frequency having a same measurement unit. In one embodiment, the output voltages having substantially same switching pattern is generated due to switching of switching units of the filtering unit and the power conversion unit based on a frequency having substantially same measurement unit. The term "measurement unit," as used herein, may be used to refer to only kilo hertz (kHz) unit of the frequency. For example, switching frequency of switching units of the filtering unit and switching frequency of switching units of the power conversion unit are represented by kHz. Further, the switching units of the converter of the filtering unit and the switching units of the power conversion unit are switched based on a substantially same switching technique. The term "switching technique" as disclosed herein refers to a technique such as a regular pulse width modulation (PWM) technique, a space vector PWM (SVPWM) technique, and the like.

The control of the converter of the filtering unit and the converter of the power conversion unit are simplified since the switching units of the converter of the filtering unit and the switching units of the power conversion unit are switched based on a substantially same switching technique and frequency. Additionally, there is no need for any additional sensing circuitry. The exemplary filtering system and an exemplary method of operating the filtering system may be employed in imaging systems such as MRI device and also in other systems employing power converters.

Turning now to the drawings and by way of example in FIG. 1, a system 100 in accordance with certain embodiments of the present invention is shown. The system 100 includes a power conversion unit 102, a filtering unit 104, a controlling unit 116, and a load 106. In one embodiment, the power conversion unit 102 includes at least one first converter 108. The at least one first converter 108 may include a pulse width modulated (PWM) converter.

An output end of the at least one first converter 108 is operatively coupled to the filtering unit 104. The filtering unit 104 is used for reducing/canceling high frequency noise components generated at the output end of the at least one first converter 108 and generate a filtered electrical output 117. In one embodiment, the filtered electrical output 117 includes a voltage signal.

The filtering unit 104 includes an active filter subunit 110 coupled to a high frequency passive filter 112. In one embodiment, the active filter subunit 110 is a high pass active filter. The active filter subunit 110 includes at least one second converter 114.

In one specific embodiment, the number of second converters 114 of the filtering unit 104 is equal to the number of first converters 108 of the power conversion unit 102. Furthermore, a topology of the at least one second converter 114 is substantially same as a topology of the at least one first converter 108.

The filtering unit 104 injects a high frequency voltage signal to the output end of the at least one first converter 108 to filter high frequency noise components from the output generated by the at least one first converter 108. Furthermore, the filtering unit 104 provides the filtered electrical output 117 to the load 106. The load 106 includes at least one of an inductive coil, a motor, and the like.

The controlling unit 116 switches the at least one first converter 108 to generate a first output voltage and the at least one second converter 114 to generate a second output voltage. The first output voltage and the second output voltage have a substantially same switching pattern. The generation of substantially same switching pattern of the first output voltage and the second output voltage is explained in greater detail with reference to subsequent figures.

The controlling unit 116 determines a switching technique and switching frequency of the at least one first converter 108 and the at least one second converter 114. In one embodiment, the at least one first and second converters 108, 114 are switched based on a frequency having same measurement unit and a substantially same switching technique. In one embodiment, the at least one first and second converters 108, 114 are switched at a same switching frequency, for example, 20 kHz. In another embodiment, the at least one first and second converters 108, 114 are switched at different switching frequencies. For example, the switching frequency of the at least one first converter 108 is half the switching frequency of the at least one second converter. For example, if the switching frequency of the second converter is 20 kHz, the switching frequency of the first converter is 10 kHz. In yet another embodiment, the switching frequency of the at least one first converter 108 is twice the switching frequency of the at least one second converter. For example, if the switching frequency of the second converter is 20 kHz, the switching frequency of the first converter is 40 kHz.

As noted hereinabove, the first output voltage and the second output voltage have a substantially same switching pattern. Therefore, high frequency noise components of the first output voltage generated by the at least one first converter 108 is cancelled by high frequency filter component of the second output voltage generated by the at least one second converter 114. As a result, the high frequency noise components generated by the at least one first converter 108 is filtered. The process of filtering the high frequency noise components will be described in greater detail with reference to subsequent figures.

In certain embodiments, the controlling unit 116 includes one or more processing units performs the functions of the controlling unit 116. As used herein, the term "processing unit" refers not only to integrated circuits but also refers to a controller, a microcontroller, a microcomputer, a programmable logic controller (PLC), application-specific processors, digital signal processors (DSPs), Application Specific Integrated Circuits (ASICs), Field Programmable Gate Arrays (FPGAs), and/or any other programmable circuits.

Figure 2:
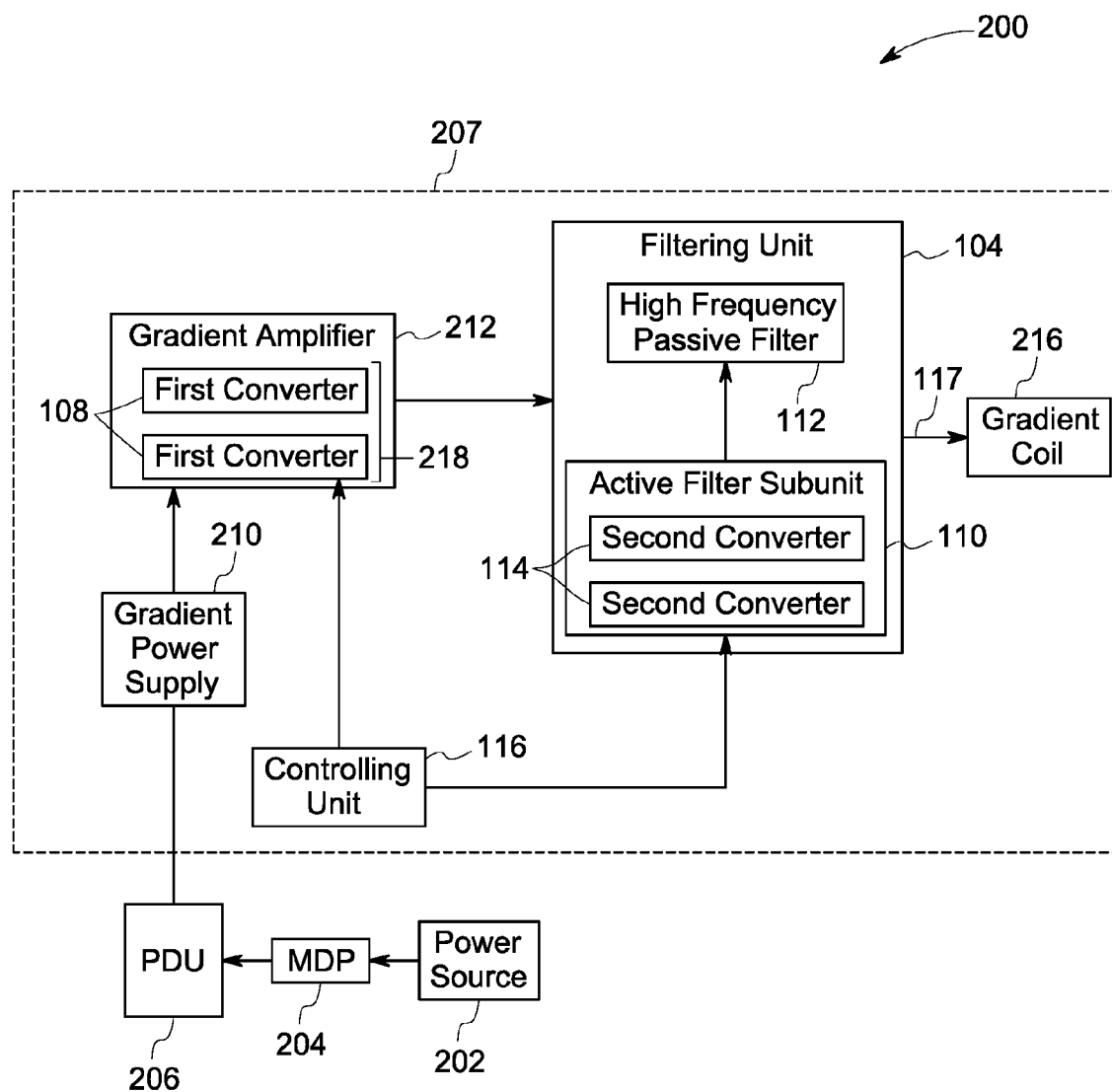
FIG. 2 is a block diagram of an imaging system having a system used for filtering high frequency noise components generated by a power conversion unit in accordance with certain embodiments of the present invention.

FIG. 2 is a block diagram illustration of an imaging system 200 in accordance with certain embodiments of the present invention. In the illustrated embodiment, the imaging system 200 is a magnetic resonance imaging (MRI) system. The imaging system 200 includes a power source 202, a main disconnect panel (MDP) 204, a power distribution unit (PDU) 206, and a gradient unit 207. The other components of the imaging system 200 including a radio frequency (RF) transmit chain, a RF receive chain, a control subunit, patient handling unit, and a plurality of auxiliary units are not shown.

The power source 202 is coupled to the gradient unit 207 via the MDP 204 and the PDU 206. The power source 202 supplies an alternating current (AC) input for performing the imaging function. Further, the MDP 204 performs one or more of functions of under-voltage protection, overcurrent protection, and a local disconnect of the imaging system 200. In one embodiment, the MDP 204 includes a panel having a plurality of circuit breakers such as an earth leakage circuit breaker (ELCB). In one embodiment, the PDU 206 is a low frequency power distribution unit (LFPDU). In other embodiments, the PDU 206 may be a high frequency power distribution unit (HFPDU).

The gradient unit 207 includes a gradient power supply source 210, a gradient amplifier 212, the filtering unit 104, and a gradient coil 216. Further, the imaging system 200 includes a MRI scanner (not shown), having a magnet assembly.

The gradient power supply source 210 includes a X-axis power supply source, a Y-axis power supply source, and a Z-axis power supply source. The gradient amplifier 212 includes a X-axis amplifier, a Y-axis amplifier, and a Z-axis amplifier. The gradient coil 216 includes a X-axis coil, a Y-axis coil, and a Z-axis coil.

The gradient power supply source 210 supplies electrical power to the corresponding gradient amplifier 212. Particularly, the X-axis power supply source, the Y-axis power supply source, and the Z-axis power supply source supply electric power to the X-axis amplifier, the Y-axis amplifier, and the Z-axis amplifier, respectively. Further, the gradient amplifier 212 is coupled to the gradient coil 216. In particular, the X-axis amplifier, the Y-axis amplifier, and the Z-axis amplifier are coupled to the X-axis coil, the Y-axis coil, and the Z-axis coil, respectively.

The gradient amplifier 212 includes a multilevel converter 218. The multilevel converter 218 includes the plurality of first converters 108. The first converters 108 of the gradient amplifier 212 control a current flowing to the gradient coil 216. The current supplied to the gradient coil 216 facilitates to create a magnetic field having a desired gradient in a space where a patient is placed for scanning Such a magnetic field is used in conjunction with excitation of RF coils to generate images of a patient's body while conducting a scan operation.

High frequency noise components are generated at the output of the first converters 108 since the first converters 108 of the gradient amplifier 212 are pulse width modulated converters. It is undesirable to transmit such high frequency noise components to the gradient coil 216. If the high frequency noise components are transmitted to the gradient coil 216, then the high frequency noise components may cause degradation of an insulation of the gradient coil 216. Furthermore, the transmission of the high frequency noise components to the gradient coil 216 affects the quality of image obtained. Therefore, it is desirable to minimize transmission of the high frequency noise components to the gradient coil 216. In accordance with the embodiment of the present invention, the filtering unit 104 is used to filter any high frequency noise components generated by the first converters 108. Specifically, the filtering unit 104 is used to reduce transmission of the high frequency noise components from the first converters 108 of the gradient amplifier 212 to the gradient coil 216.

In the illustrated embodiment, the filtering unit 104 includes the active filter subunit 110 operatively coupled to the high frequency passive filter 112. The filtering unit 104 is used to provide the filtered electrical output 117 devoid of high frequency noise components to the gradient coil 216.

The active filter subunit 110 includes the plurality of second converters 114. In one embodiment, a direct current (DC) voltage source, for example, an external DC voltage source, is used to supply an input voltage to the second converters 114. In another embodiment, gradient power supply source 210 supplies isolated DC voltages to the first converters 108 and the second converters 114. In yet another embodiment, the first converters 108 and the second converter 114 receive the same DC input voltage.

The system 200 further includes the controlling unit 116 for determining switching technique and switching frequency of the first converters 108 and the second converters 114. The first converters 108 and the second converters 114 are switched based on a substantially same switching technique and same switching frequency to generate a first output voltage and a second output voltage respectively. In accordance with embodiments of the present invention, the pattern of the first output voltage and the second output voltage is substantially same. Substantially same pattern of voltage obtained at output of the first and second converters 108, 114 facilitates to cancel high frequency noise components generated by the first converter 108.

Although in the illustrated embodiment, the controlling unit 116 is integral to the gradient unit 207, in another embodiment, the controlling unit 116 may be disposed spaced apart from other components of the imaging system 200 to ensure an efficient operation of the controlling unit 116. In such an embodiment, the controlling unit 116 is not affected by the high strength magnetic field generated by the imaging system 200.

Figure 3:
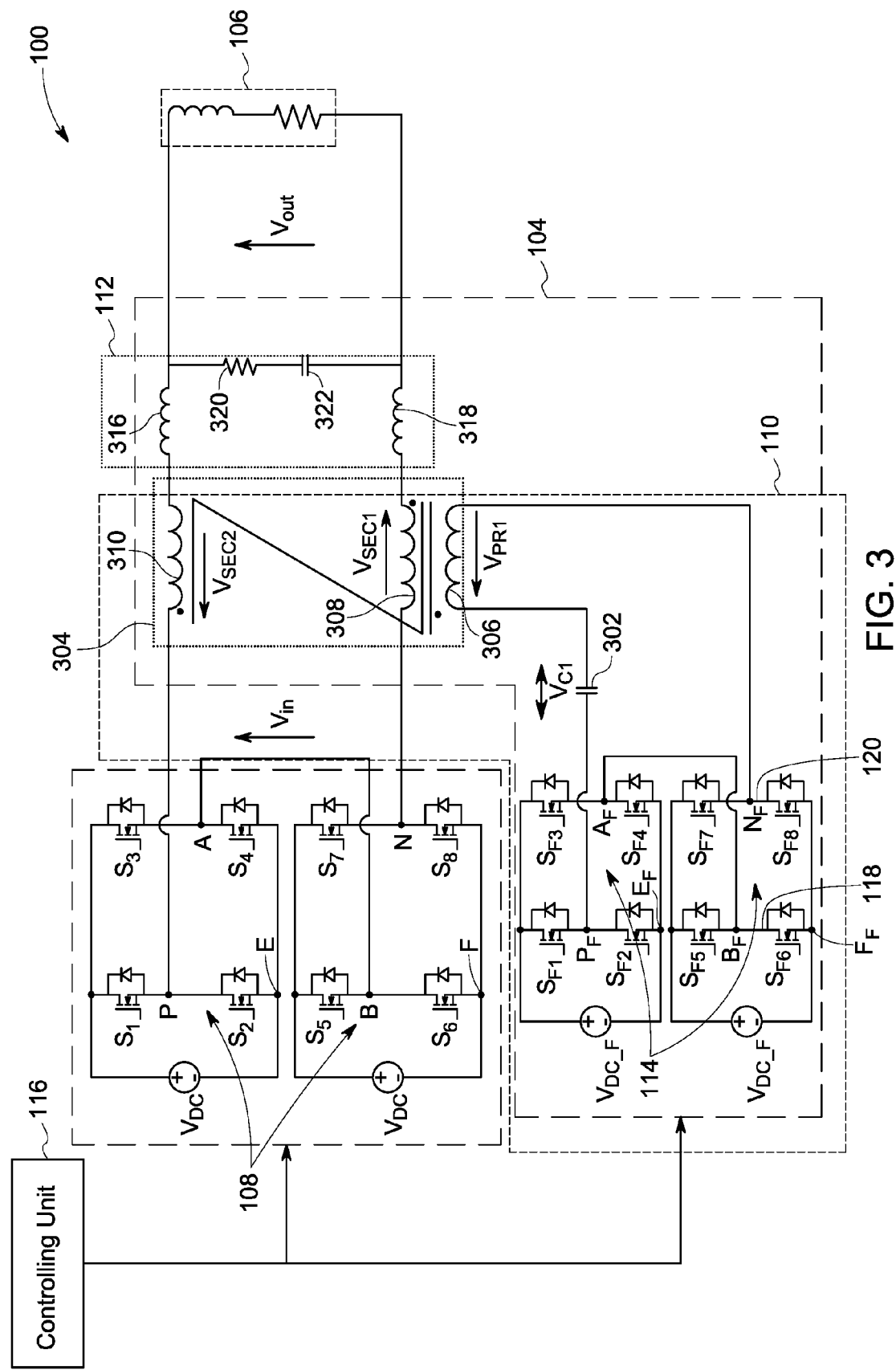
FIG. 3 is a detailed diagrammatical representation of the system used for filtering high frequency noise components generated by the power conversion unit in accordance with the embodiment of FIG. 1.

FIG. 3 is a detailed diagrammatical representation of the system 100 in accordance with the embodiment of FIG. 1. The filtering system 100 includes two first converters 108 and the filtering unit 104. In the illustrated embodiment, the two first converters 108 are operatively coupled to each other in series.

The filtering unit 104 includes an active filter subunit 110 coupled to a high frequency passive filter 112. The active filter subunit 110 includes two second converters 114, a blocking capacitor 302, and a plurality of inductors 304. Further, the high frequency passive filter 112 includes two inductors 316, 318, a capacitor 322, and a damping resistor 320. The number of inductors may vary depending on the application.

The plurality of inductors 304 includes a first coil 306 and two second coils 308, 310. The first coil 306 is operatively coupled to the second coils 308, 310. In particular, the first coil 306 is magnetically coupled to the second coils 308, 310. In the illustrated embodiment, turns ratio N of the plurality of inductors 304 is 1. The term "turns ratio" refers to a ratio of the number of turns of the second coil 308/310 to the number of turns of the first coil 306.

Furthermore, two first converters 108 include a plurality of switching units represented by $S_1$, $S_2$, $S_3$, $S_4$, $S_5$, $S_6$, $S_7$, and $S_8$. An isolated input voltage having an amplitude $V_{DC}$ is supplied at the input of each of the first converters 108.

Each of the second converters 114 is a full bridge converter having two phase legs 118, 120. The two second converters 114 include a plurality of switching units represented by $SF^1$, $SF^2$, $SF^3$, $SF^4$, $SF^5$, $SF^6$, $SF^7$, and $SF^8$. An isolated input voltage $V_{DC\_F}$ is supplied at the input of each of the second converters 114. The amplitude of input voltage $V_{DC\_F}$ is dependent on turns ratio of the plurality of inductors 304. In one embodiment, if the turns ratio of the plurality of inductors 304 is N, then amplitude of input voltage $V_{DC\_F}$ is equal to $0.5 \times V_{DC}/N$.

In one embodiment, at least one of the switching units of the first and second converters 108, 114 includes a single switch. In such an embodiment, the single switch may be a semiconductor switch. In another embodiment, at least one of the switching units of the first and second converters 108, 114 includes a power semiconductor module having a plurality of switches. In such an embodiment, at least one of the plurality of switches may be a semiconductor switch. In one specific embodiment, the semiconductor switch may be a controllable semiconductor switch. The controllable semiconductor switch may be a partially controllable switch or a fully controllable switch. In one embodiment, the semiconductor switch includes at least one of an insulated gate bipolar transistor, a metal oxide semiconductor field effect transistor, a field-effect transistor, an injection enhanced gate transistor, and an integrated gate commutated thyristor. In another embodiment, the semiconductor switch includes at least one of a gallium nitride based switch, a silicon carbide based switch, and a gallium arsenide based switch.

The first and second converters 108, 114 are switched by the controlling unit 116. The controlling unit 116 switches the first and second converters 108, 114 at a first frequency and a second frequency respectively, where the first and second frequencies have same measurement unit. Particularly, the switching units of the first and second converters 108, 114 are switched by the controlling unit 116. The switching units of the first and second converters 108, 114 are switched at frequencies having same measurement unit. In one embodiment, the switching units of the first converters 108 and the second converters 114 are switched at a substantially same frequency. In another embodiment, the switching units of the first and second converters 108, 114 are switched at different frequencies. In one specific embodiment, the switching frequency of the second converters 114 is either half or twice the switching frequency of the first converters 108. In such an embodiment, the first converters 108 are switched using a space vector pulse width modulation (SVPWM) based technique and the second converters 114 are switched using a regular pulse width modulation technique. As a result, a common mode noise generated by the first converters 108 is reduced.

An output voltage $V_{in}$ is generated based on the switching of the switching units of the first converters 108. The output voltage $V_{in}$ may be alternatively referred to as a first output voltage. Similarly, an output voltage $V_F$ is generated based on the switching of the switching units of the second converter 114. The output voltage $V_F$ may be alternatively referred to as a second output voltage. Furthermore, the ratio between $V_F$ and $V_{in}$ is determined by the turns ratio of the plurality of inductors 304. In one embodiment, if the magnitude of the first output voltage $V_{in}$ is $V_{DC}$ and the turns ratio of the plurality of inductors 304 is 'N', then the magnitude of the second output voltage $V_F$ is equal to $V_{DC}/2N$.

Further, switching pattern of the first output voltage ($V_{in}$) generated by the first converters 108 and switching pattern of the second output voltage ($V_F$) generated by the second converters 114 are substantially same. Since, the first output voltage ($V_{in}$) generated by the first converters 108 and the second output voltage ($V_F$) generated by the second converters 114 have substantially same switching pattern, the high frequency noise components generated by the first converters 108 are filtered/reduced. In one embodiment, the frequency of the high frequency noise components may range from about few kilohertz (kHz) to about few megahertz (MHz). The generation of output voltages ($V_{in}$) and ($V_F$) having same switching pattern by switching the first and second converters 108, 114 at same or different frequencies and same or different switching techniques are explained in greater detail with reference to subsequent figures.

Figure 4:
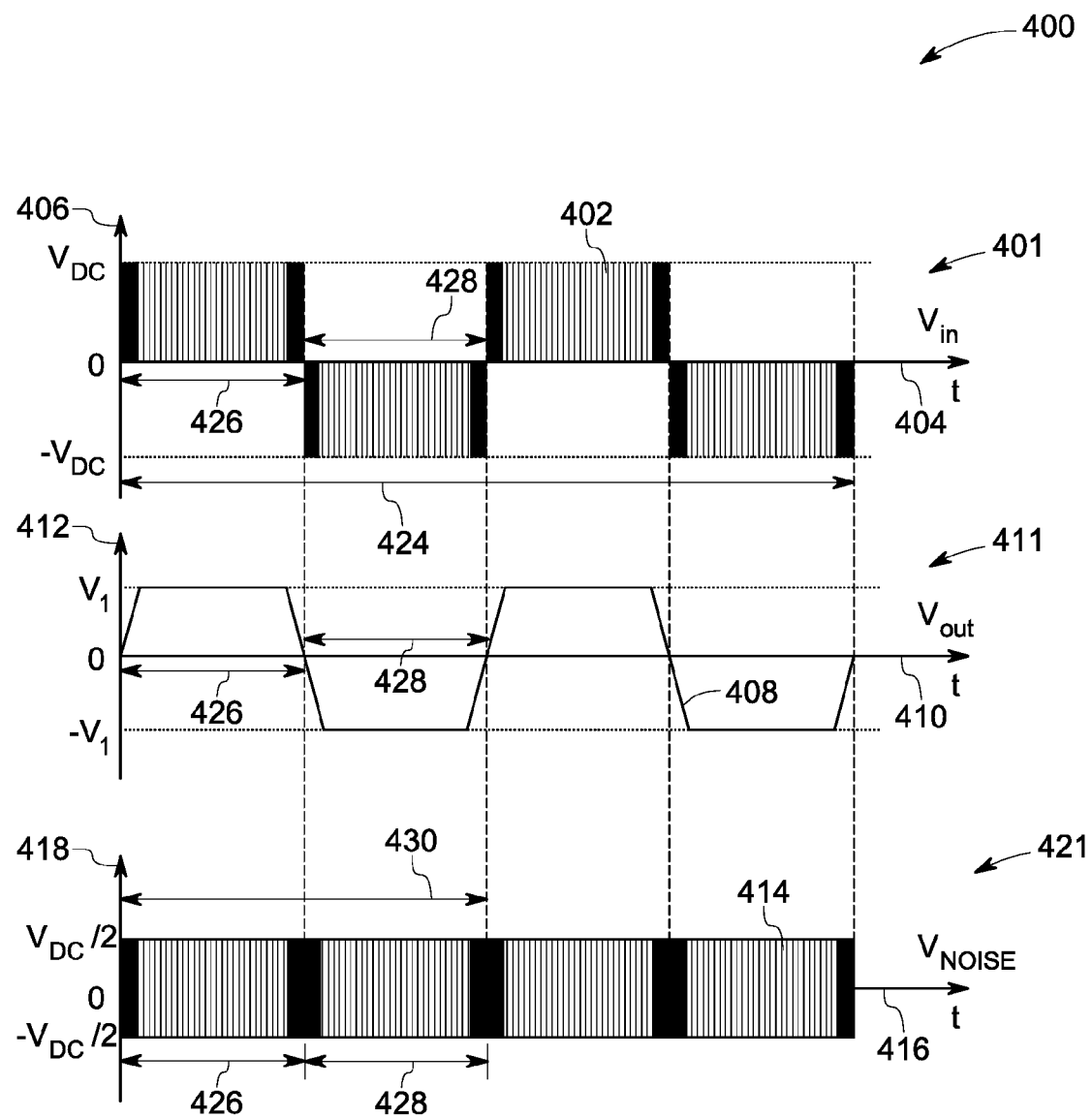
FIG. 4 is a waveform representation of a plurality of electrical parameters of the system used for filtering high frequency noise components generated by the power conversion unit in accordance with the embodiments of FIGS. 1 and 3.

Turning now to FIG. 4, a waveform representation 400 of a plurality of electrical parameters of the system 100 in accordance with the embodiments of FIGS. 1 and 3 is shown. Particularly, waveform representation 400 of the electrical parameters of the first converters 108 is shown. The electrical parameters of the first converters 108 are generated by switching the first converters 108.

In the illustrated embodiment, a first waveform representation 401 includes x-axis 404 representative of time and y-axis 406 representative of amplitude. A signal 402 is representative of the output voltage $V_{in}$ of the first converters 108. The amplitude of the output voltage $V_{in}$ is represented by $V_{DC}$. The output voltage $V_{in}$ includes a filtered electrical output $V_{out}$ and high frequency noise components $V_{NOISE}$. The amplitude of the output voltage $V_{in}$ is high $(+V_{DC})$ during a time period 426 and low $(-V_{DC})$ during a time period 428.

A second waveform representation 411 includes x-axis 410 representative of time and y-axis 412 representative of amplitude. A signal 408 is representative of the filtered electrical output $V_{out}$. The amplitude of the filtered electrical output $V_{out}$ is represented by $V_1$. The amplitude $V_1$ of filtered electrical output $V_{out}$ is an average of the output voltage $V_{in}$ during each switching cycle during a time period 424.

A third waveform representation 421 includes x-axis 416 representative of time and y-axis 418 representative of amplitude. A signal 414 is representative of the high frequency noise components $V_{NOISE}$. The high frequency noise components $V_{NOISE}$ has an amplitude $V_{DC}/2$.

Figure 5:
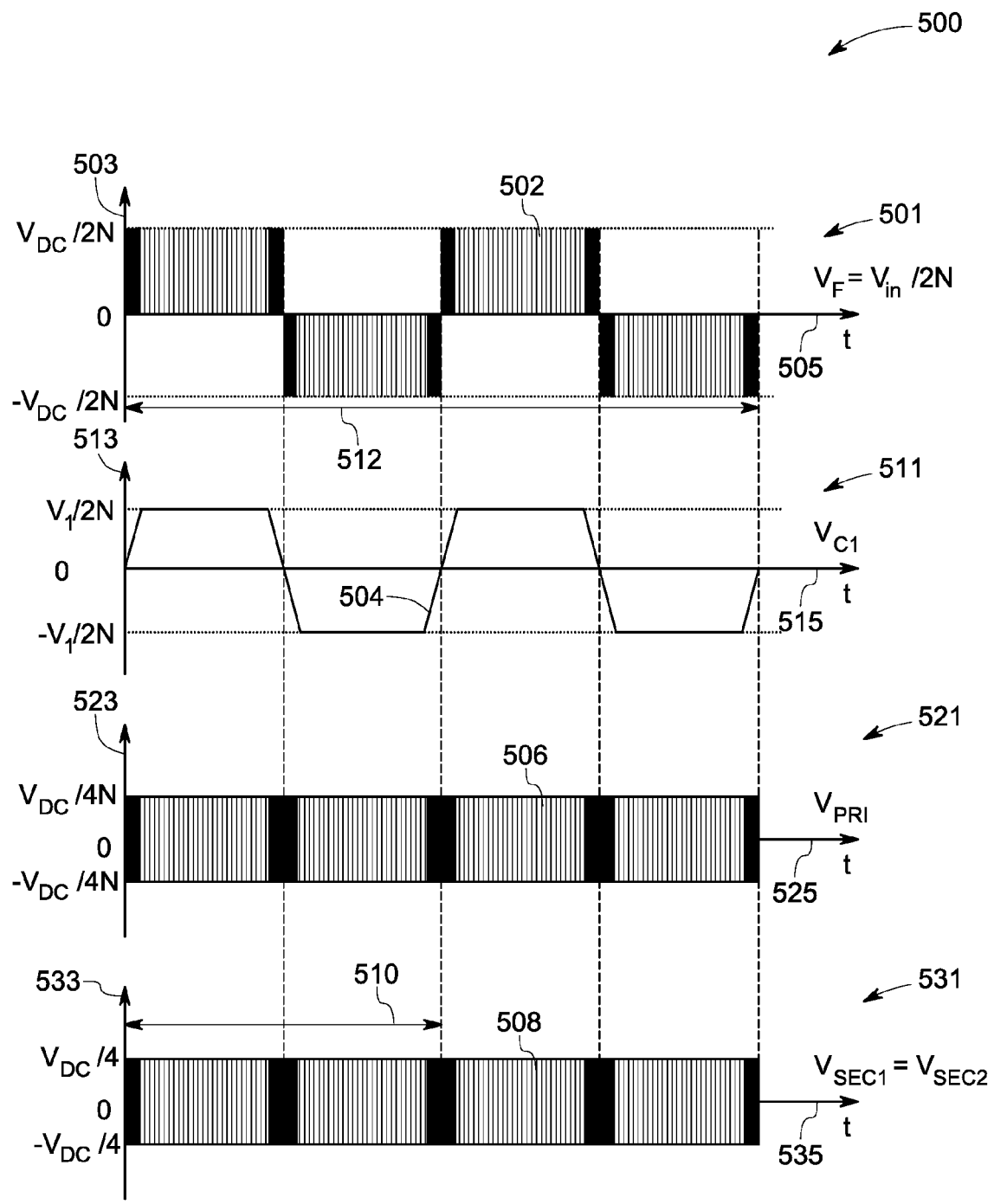
FIG. 5 is a waveform representation of a plurality of electrical parameters of a system used for filtering high frequency noise components generated by the power conversion unit in accordance with the embodiments of FIGS. 1 and 3.

FIG. 5 is a waveform representation 500 of electrical parameters of the system 100 in accordance with the embodiment of FIGS. 1 and 3. In particular, waveform representation 500 of electrical parameters generated by the filtering unit 104 is shown. Electrical parameters of the filtering unit 104 is generated by switching the second converters 114.

A first waveform representation 501 includes x-axis 505 representative of time and y-axis 503 representative of amplitude. The amplitude of input voltage $V_{DC\_F}$ of the second converters 114 is represented by $V_{DC}/2N$. A signal 502 is representative of the voltage $V_F$ generated by the second converters 114. The amplitude of voltage $V_F$ is represented by $V_{DC}/2N$, where N is the turns ratio of the plurality of inductors 304. In the illustrated embodiment, the turns ratio N is equal to 1. Accordingly, the amplitude of voltage signal $V_F$ is $V_{DC}/2$.

A second waveform representation 511 includes x-axis 515 representative of time and y-axis 513 representative of amplitude. The voltage $V_F$ includes a low frequency (LF) component and a high frequency filter component. The LF component is blocked by the blocking capacitor 302. Accordingly, a voltage $V_{C1}$ is generated across the blocking capacitor 302 and is represented by a signal 504. The amplitude of voltage $V_{C1}$ is represented by $V_1/2N$, and hence, if N=1, then $V_{C1}$ is equal to $V_1/2$. The amplitude $V_1/2$ of voltage $V_{C1}$ is an average of the voltage $V_F$ during each switching cycle during a time period 512. Further, the high frequency filter component is allowed to pass through the blocking capacitor 302 to the first coil 306.

A third waveform representation 521 includes x-axis 525 representative of time and y-axis 523 representative of amplitude. The high frequency filter component is transmitted from the first coil 306 to the second coils 308, 310. The high frequency filter component at the first coil 306 is represented by $V_{PRI}$. The voltage $V_{PRI}$ generated across the first coil 306 is represented by a signal 506.

A fourth waveform representation 531 includes x-axis 535 representative of time and y-axis 533 representative of amplitude. The high frequency filter component at the second coil 308 is represented by $V_{SEC1}$ and at the second coil 310 is represented by $V_{SEC2}$. The voltage $V_{SEC1}$ is substantially equal to the voltage $V_{SEC2}$. The voltages $V_{SEC1}$ and $V_{SEC2}$ across the second coils 308, 310 are represented by a signal 508. The amplitude of the voltage $V_{PRI}$ is $V_{DC}/4N$, if N=1, then voltage $V_{PRI}=V_{DC}/4$. Further, if $V_{PRI}=V_{DC}/4$, the amplitude of the voltages $V_{SEC1}$ and $V_{SEC2}$ across the second coils 308, 310 is $V_{DC}/4$, since the turns ratio is equal to 1. In one embodiment, the voltages across the second coils 308, 310 are equal. A voltage $V_{SEC1}+V_{SEC2}$ is obtained across the two second coils 308, 310 (shown in FIG. 3) due to mutual coupling of the second coils 308, 310. In the illustrated embodiment, the amplitude of voltage $V_{SEC1}+V_{SEC2}$ is represented by $V_{DC}/2$. The voltage $V_{SEC1}+V_{SEC2}$ is alternatively referred to as a filtering component.

As noted hereinabove with reference to FIG. 4, the output voltage $(V_{in})$ generated by the first converters 108 and the output voltage $(V_F)$ generated by the second converters 114 have substantially same switching pattern. Therefore, the pattern of the voltage $V_{SEC1}+V_{SEC2}$ is same as the pattern of the voltage $V_{NOISE}$. In the illustrated embodiment, the amplitude and pattern of the voltage $V_{SEC1}+V_{SEC2}$ is same as the amplitude and pattern of the voltage $V_{NOISE}$ 414 generated by the first converters 108. Specifically, the amplitude of the voltage $V_{SEC1}+V_{SEC2}$ and the voltage $V_{NOISE}$ 414 is $V_{DC}/2$. The pattern of the voltage $V_{SEC1}+V_{SEC2}$ being same as the pattern of the voltage $V_{NOISE}$ 414 alludes to the fact that that number of pulses in the voltage $V_{SEC1}+V_{SEC2}$ during a time period 510 is same as number of pulses in the voltage $V_{NOISE}$ 414 during the time period 430. Furthermore, a leading edge and a trailing edge of each pulse of the voltage $V_{SEC1}+V_{SEC2}$ during the time period 510 is aligned to respectively a leading edge and a trailing edge of a corresponding pulse of the voltage $V_{NOISE}$ during the time period 430 with reference to time.

In accordance with embodiments of the present invention, the voltage $V_{SEC1}+V_{SEC2}$ cancels the voltage $V_{NOISE}$ generated by the first converters 108 since the amplitude and pattern of the voltage $V_{SEC1}+V_{SEC2}$ is same as the amplitude and pattern of the voltage $V_{NOISE}$. In particular, the voltage $V_{SEC1}+V_{SEC2}$ is subtracted from the voltage $V_{in}$ to obtain the voltage $V_{out}$. Accordingly, the high frequency noise components represented by voltage $V_{NOISE}$ are reduced/cancelled. In certain embodiments, minimal number of ripples may still exist in the voltage obtained from the filtering unit 104. Therefore, it may be desirable to reduce such ripples using the high frequency passive filter 112. The filtered electrical output $V_{out}$ devoid of any harmonics is transmitted to the load 106. Since the filtered electrical output $V_{out}$ is substantially free of any high frequency harmonics/ripples, any losses in the load 106 are minimized. In one embodiment, the percentage of high frequency harmonics/ripples may be about 10 percent of the amplitude of filtered electrical output $V_{out}$. The filtered electrical output $V_{out}$ being free of any high frequency harmonics/ripples facilitates to enhance quality of the image generated by the imaging system.

Figure 6:
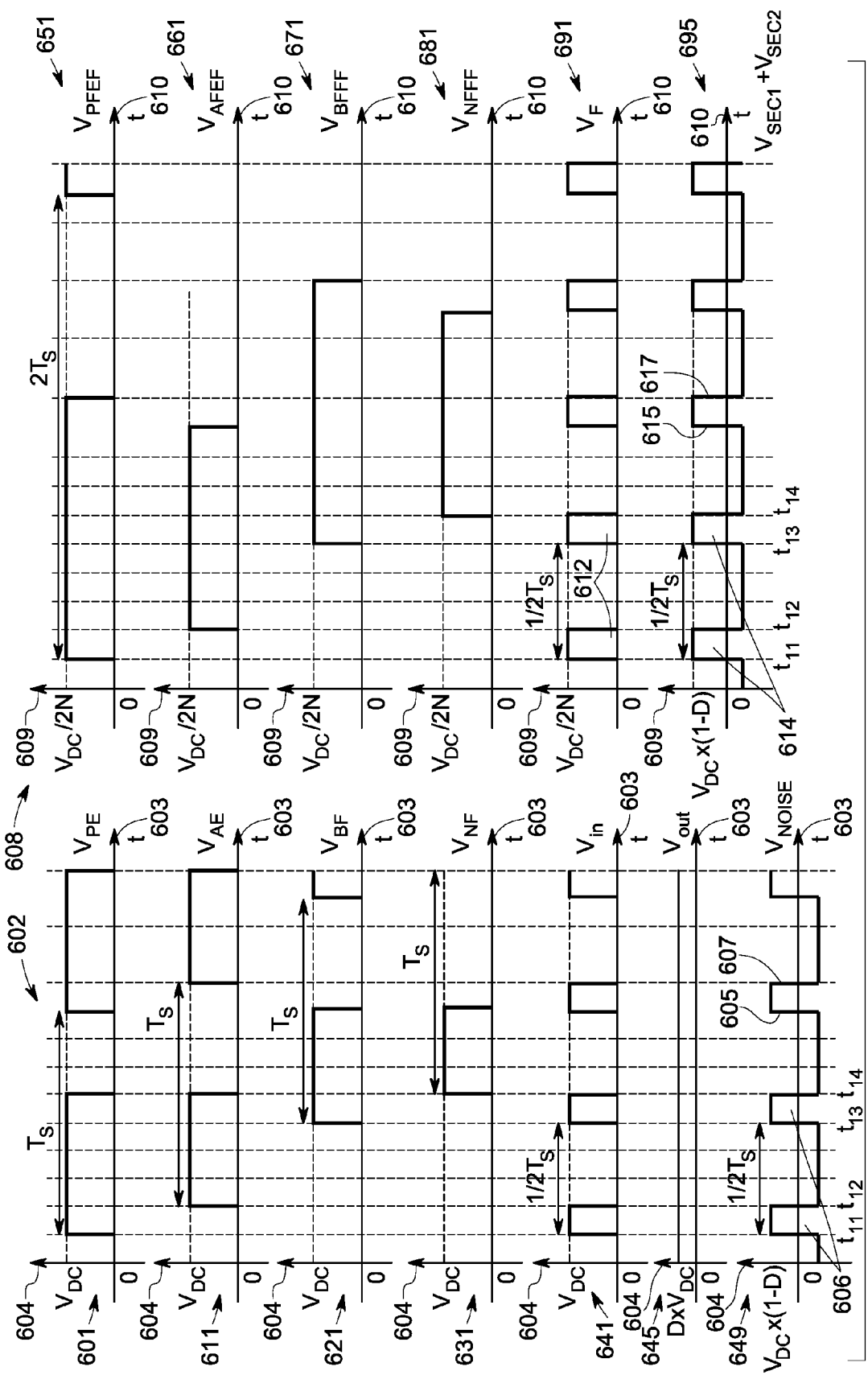
FIG. 6 is a waveform representation of a plurality of electrical parameters of the system used for filtering high frequency noise components generated by the power conversion unit in accordance with the embodiments of FIGS. 1, 3, and 4.

Referring now to FIG. 6, a waveform representation of electrical parameters of the system 100 of in accordance with the embodiments of FIGS. 1, 3, and 4. Specifically, waveform representation of electrical parameters of the first converters 108 and the second converters 114 is shown. Specifically, an enlarged view of the waveform representation of any electrical parameter corresponding to the time period 426 is shown. In the illustrated embodiment, the second converters 114 are switched at half of the frequency of the first converters 108. The second converters 114 are switched using a regular PWM technique and the first converters 108 are switched using a SVPWM based technique.

A waveform representation 602 includes y-axis 604 indicative of amplitude in volts and x-axis 603 indicative of time in seconds. Further, the waveform representation 602 includes a plurality of waveforms 601, 611, 621, 631, 641, 645, 649 of the electrical parameters of the two first converters 108. The waveforms 601, 611, 621, 631, 641, 645, and 649 represent voltages $V_{PE}$, $V_{AE}$, $V_{BF}$, $V_{NF}$, $V_{in}$, $V_{out}$, and $V_{NOISE}$, respectively that are generated due to the switching of the first converters 108. The voltage $V_{PE}$ is representative of a voltage at point P (shown in FIG. 3) with respect to terminal E. The voltage $V_{PE}$ is generated by switching the switching units $S_1$ and $S_2$. A high value of voltage $V_{PE}$ is obtained when the switching unit $S_1$ is in an activated state and the switching unit $S_2$ is in a deactivated state. An activated state of a switching unit refers to a state of a switching unit when the switching unit is providing an electrically conducting path. A deactivated state of a switching unit refers to a state of a switching unit when the switching unit is providing an electrically non-conducting path.

The time period of the voltage $V_{PE}$ is represented by $T_s$ and the switching frequency of the voltage $V_{PE}$ is represented by $f_{sw}$. In one embodiment, the frequency $f_{sw}$ is about 20 kilohertz (kHz). The switching frequency of the voltage $V_{PE}$ being $f_{sw}$ alludes to the fact that the switching units $S_1$ and $S_2$ are switched at the switching frequency $f_{sw}$.

Similarly, the voltage $V_{AE}$ is representative of voltage at point A with respect to the terminal E shown in FIG. 3. The voltage $V_{AE}$ is generated by switching the switching units $S_3$ and $S_4$. A high value of voltage $V_{AE}$ is obtained when the switching unit $S_3$ is in an activated state and the switching unit $S_4$ is in a deactivated state. In a similar manner, the voltage $V_{BF}$ is representative of voltage at point B of with respect to the terminal F shown in FIG. 3. The voltage $V_{BF}$ is generated by switching the switching units $S_5$ and $S_6$. A high value of voltage $V_{BF}$ is obtained when the switching unit $S_5$ is in an activated state and the switching unit $S_6$ is in a deactivated state. Similarly, the voltage $V_{NF}$ is representative of voltage at point N with respect to the terminal F shown in FIG. 3. The voltage $V_{NF}$ is generated by switching the switching units $S_7$ and $S_8$. A high value of the voltage $V_{NF}$ is obtained when the switching unit $S_7$ is in an activated state and the switching unit $S_5$ is in a deactivated state. The voltages $V_{AE}$, $V_{BF}$, and $V_{NF}$ have a switching period represented by $T_s$. Further, the switching frequency of the voltages $V_{AE}$, $V_{BF}$ and $V_{NF}$ is represented by $f_{sw}$. The output voltage $V_{in}$ generated by the first converters 108 is equal to $(V_{PE}-V_{AE})+(V_{BF}-V_{NF})$.

The output voltage $V_{in}$ includes high frequency noise components $V_{NOISE}$ and a filtered electrical output $V_{out}$. The amplitude of filtered electrical output $V_{out}$ is an average of output voltage $V_{in}$ over a switching cycle. In the embodiment of FIG. 6, one switching cycle is indicated by a time period $T_s$. The amplitude of the filtered electrical output $V_{out}$ is $D \times V_{DC}$, where D is the duty ratio of the corresponding voltage signal. In such an embodiment, D is the duty ratio of the voltage signal $V_{out}$. The time period of the output voltage $V_{in}$ is represented by $0.5 \times T_s$. The high frequency noise components $V_{NOISE}$ are represented by pulses 606 having an amplitude $V_{DC} \times (1-D)$ during duration of time instant $t_{11}$ to time instant $t_{12}$ and during duration from time instant $t_{13}$ to time instant $t_{14}$.

A waveform representation 608 includes y-axis 609 indicative of amplitude in volts and x-axis 610 indicative of time in seconds. The waveform representation 608 includes a plurality of waveforms 651, 661, 671, 681, 691, 695 representative of electrical parameters of filtering unit 104. The plurality of waveforms 651, 661, 671, 681, 691, 695 represent voltages $V_{PFEF}$, $V_{AFEF}$, $V_{BFFF}$, $V_{NFFF}$, $V_F$, $V_{SEC1}+V_{SEC2}$, respectively that are generated due to the switching of the second converters 114. The voltage $V_{PFEF}$ is representative of a voltage at point $P_F$ with respect to terminal $E_F$ shown in FIG. 3. The voltage $V_{PFEF}$ is generated by switching of the switching units $S_{F1}$ and $S_{F2}$. A high value of voltage $V_{PFEF}$ is obtained when the switching unit $S_{F1}$ is in an activated state and the switching unit $S_{F2}$ is in a deactivated state. The time period of the voltage $V_{PFEF}$ is represented by $2 \times T_s$ and the switching frequency of voltage $V_{PFEF}$ is represented by $0.5 \times f_{sw}$. The switching frequency of voltage $V_{PFEF}$ being $0.5 \times f_{sw}$ alludes to the fact that the switching units $S_{F1}$ and $S_{F2}$ are switched at a switching frequency of $0.5 \times f_{sw}$.

Similarly, the voltage $V_{AFEF}$ is representative of a voltage at point $A_F$ with respect to terminal $E_F$ shown in FIG. 3. The voltage $V_{AFEF}$ is generated by switching of the switching units $S_{F3}$ and $S_{F4}$. A high value of voltage $V_{AFEF}$ is obtained when the switching unit $S_{F3}$ is in an activated state and the switching unit $S_{F4}$ is in a deactivated state. In a similar manner, the voltage $V_{BFFF}$ is representative of a voltage at a point BF with respect to terminal $F_F$ shown in FIG. 3. The voltage $V_{BFFF}$ is generated by switching of the switching units $S_{F5}$ and $S_{F6}$. A high value of voltage $V_{BFFF}$ is obtained when the switching unit $S_{F5}$ is in an activated state and the switching unit $S_{F6}$ is in a deactivated state. Similarly, the voltage $V_{NFFF}$ is representative of a voltage at a point $N_F$ with respect to terminal $F_F$ shown in FIG. 3. The voltage $V_{NFFF}$ is generated by switching of the switching units $S_{F7}$ and $S_{F8}$. A high value of voltage $V_{NFFF}$ is obtained when the switching unit $S_{F7}$ is in an activated state and the switching unit $S_{F8}$ is in a deactivated state. The voltages $V_{AFEF}$, $V_{BFFF}$, and $V_{NFFF}$ have a switching period represented by $2 \times T_s$. Further, the switching frequency of the voltages $V_{AFEF}$, $V_{BFFF}$, and $V_{NFFF}$ is represented by $0.5 \times f_{sw}$. The output voltage $V_F$ generated by the second converters 114 is equal to $(V_{PFEF}-V_{AFEF})+(V_{BFFF}-V_{NFFF})$.

In the illustrated embodiment, the output voltage $V_F$ includes a low frequency (LF) component and a high frequency filter component. A time period of the output voltage $V_F$ represented by $0.5 \times T_s$ is equal to the time period of the output voltage $V_{in}$. Further, the amplitude and the pattern of the output voltage $V_F$ is same as the output voltage $V_{in}$. The output voltage $V_F$ includes pulses 612 having an amplitude of $V_{DC}/2N$ during time duration from time instant $t_{11}$ to time instant $t_{12}$ and during time duration from time instant $t_{13}$ to time instant $t_{14}$. If N=1, then the amplitude of pulses 612 is represented by $V_{DC}/2$. The LF component is blocked by the capacitor 302. Further, the pulses 612 representative of the high frequency filter component are obtained at the first coil 306 and is represented by $V_{PRI}$.

As noted earlier, the high frequency filter component is transmitted from the first coil 306 to the second coils 308, 310. The high frequency filter component induced at the second coil 308 is represented by $V_{SEC1}$ and at the second coil 310 is represented by $V_{SEC2}$. If N=1, the amplitude of the voltages $V_{SEC1}$ and $V_{SEC2}$ is represented by $V_{DC} \times (1-D)/2$. The voltage $V_{SEC1}$ is substantially equal to voltage $V_{SEC2}$. The voltage $V_{SEC1}+V_{SEC2}$ is obtained across the two second coils 308, 310 due to mutual coupling of the second coils 308, 310. The pulses of the voltage $V_{SEC1}+V_{SEC2}$ are represented by reference numeral 614 and pulses 614 have an amplitude of $V_{DC} \times (1-D)$ during duration of time instant $t_{11}$ to time instant $t_{12}$ and during duration from time instant $t_{13}$ to time instant $t_{14}$. The pulses 606 of the high frequency noise components $V_{NOISE}$ are time aligned with respect to the pulses 614 of the voltage $V_{SEC1}+V_{SEC2}$. Particularly, a leading edge 605 and a trailing edge 607 of each pulse 606 are aligned with a leading edge 615 and a trailing edge 617 of a corresponding pulse 614 with reference to time. Accordingly, high frequency noise components $V_{NOISE}$ represented by the pulses 606 are cancelled by corresponding pulses 614 of the voltage $V_{SEC1}+V_{SEC2}$. The filtered electrical output $V_{out}$ is substantially free of any high frequency harmonics/ripples and losses of the load 106 are minimized since the high frequency noise components $V_{NOISE}$ are cancelled.

Figure 7:
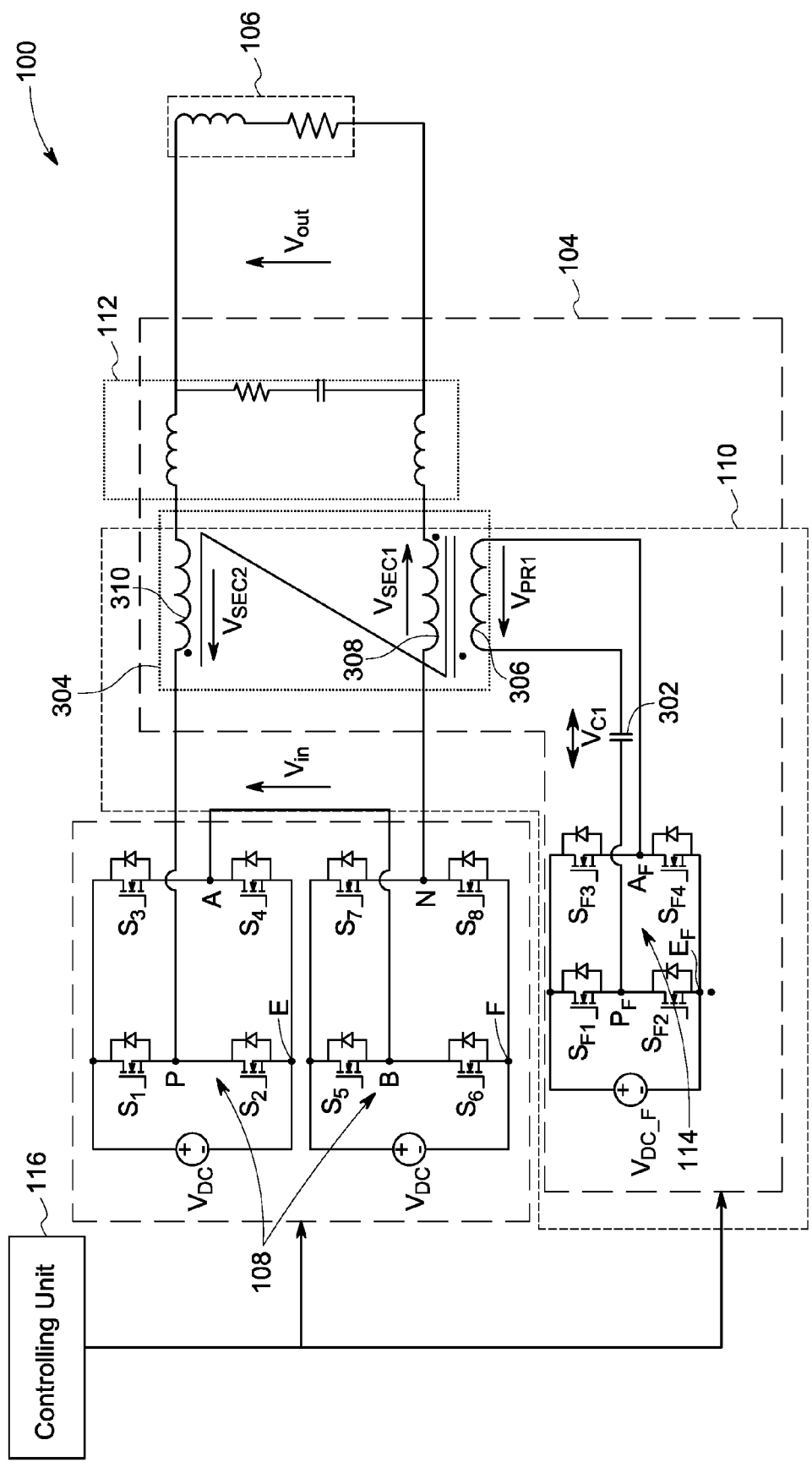
FIG. 7 is a diagrammatical representation of another embodiment of a system used for filtering high frequency noise components generated by a power conversion unit.

FIG. 7 is a diagrammatical representation of another embodiment of the system 100. In the illustrated embodiment, the system 100 includes two first converters 108, the filtering unit 104, and the load 106. The two first converters 108 are operatively coupled to each other in series to form a multilevel converter. The two first converters 108 include a plurality of switching units represented by $S_1$, $S_2$, $S_3$, $S_4$, $S_5$, $S_6$, $S_7$, and $S_8$. An isolated input voltage having magnitude $V_{DC}$ is supplied at the input of each first converter 108.

Further, the filtering unit 104 includes the active filter subunit 110 and the high frequency passive filter 112. The active filter subunit 110 is coupled to the high frequency passive filter 112. The active filter subunit 110 includes one second converter 114, the blocking capacitor 302, and the plurality of inductors 304. The second converter 114 is a full bridge converter having two phase legs, where each phase leg includes two switching units. In the illustrated embodiment, the second converter 114 includes the plurality of switching units represented by $S_{F1}$, $S_{F2}$, $S_{F3}$, and $S_{F4}$. An isolated input voltage having magnitude $V_{DC\_F}$ is supplied at the input of the second converter 114.

The system 100 further includes a controlling unit 116 for determining switching technique and switching frequency of the first converters 108 and the second converters 114. In one embodiment, the switching units $S_2$, $S_3$, $S_4$, $S_5$, $S_6$, $S_7$, and $S_8$ of the first converters 108 and the switching unit $S_{F1}$, $S_{F2}$, $S_{F3}$, and $S_{F4}$ of the second converter 114 are switched at a substantially same frequency. In another embodiment, the switching units $S_2$, $S_3$, $S_4$, $S_5$, $S_6$, $S_7$, and $S_8$ of the first converters 108 and the switching units $S_{F1}$, $S_{F2}$, $S_{F3}$, and $S_{F4}$ of the second converter 114 are switched at different frequencies. Same or different switching techniques are used to switch the first and second converters 108, 114. The output voltage ($V_{in}$) generated by the first converters 108 and the output voltage ($V_F$) generated by the second converter 114 have substantially same switching pattern.

Figure 8:
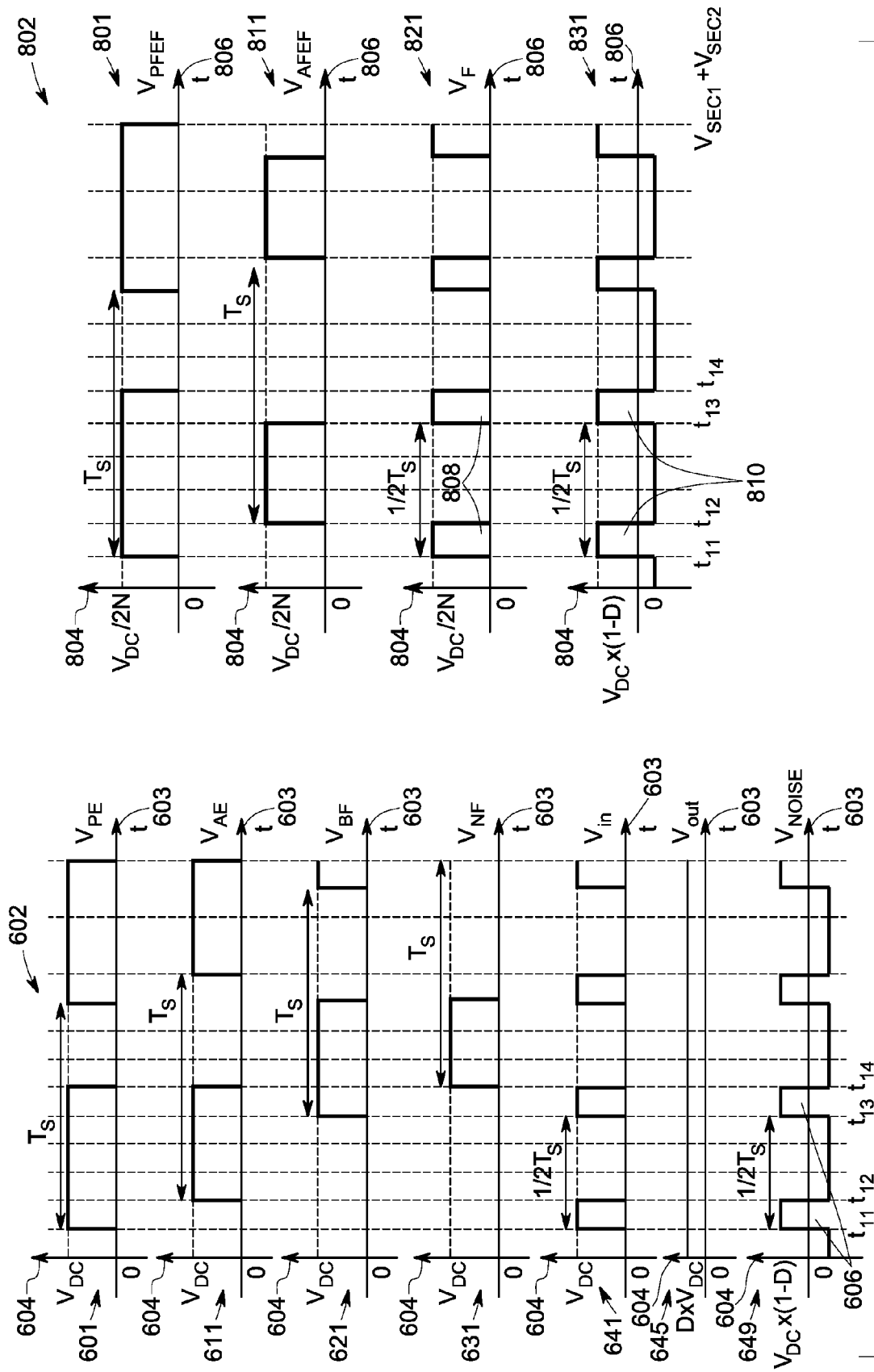
FIG. 8 is a waveform representation of a plurality of electrical parameters of the system used for filtering high frequency noise components generated by the power conversion unit in accordance with the embodiment of FIG. 7.

FIG. 8 is a waveform representation of a plurality of electrical parameters of the system 100 in accordance with the embodiment of FIG. 7. The waveform representation 602 includes y-axis 604 indicative of amplitude in volts and x-axis indicative of time in seconds. Further, the waveform representation 602 includes the plurality of waveforms 601, 611, 621, 631, 641, 645, 649 of the electrical parameters of the two first converters 108. The waveforms 601, 611, 621, 631, 641, 645, and 649 represent voltages $V_{PE}$, $V_{AE}$, $V_{BF}$, $V_{NF}$, $V_{in}$, $V_{out}$, and $V_{NOISE}$, respectively that are generated due to the switching of the first converters 108. The first converters 108 are switched based on a SVPWM technique and the second converter 114 is switched based on a regular PWM technique. Further, the first converters 108 and the second converter 114 of FIG. 7 are switched based on a same switching frequency.

The output voltage $V_{in}$ includes high frequency noise components $V_{NOISE}$ and the filtered electrical output $V_{out}$. The time duration of the output voltage $V_{in}$ is represented by $0.5\times T_s$. The amplitude of the filtered electrical output $V_{out}$ is $D\times V_{DC}$. The high frequency noise components $V_{NOISE}$ are represented by pulses 606 having an amplitude $V_{DC}\times(1-D)$ during duration of time instant $t_{11}$ to time instant $t_{12}$ and during duration from time instant $t_{13}$ to time instant $t_{14}$.

The waveform representation 802 includes y-axis 804 indicative of amplitude in volts and x-axis 806 indicative of time in seconds. The waveform representation 802 includes a plurality of waveforms 801, 811, 821, and 831 of electrical parameters of the filtering unit 104. The waveforms 801, 811, 821, and 831 represent voltages $V_{PFEF}$, $V_{AFEF}$, $V_F$, and $V_{SEC1}+V_{SEC2}$, respectively, that are generated due to the switching of the second converter 114. The voltage $V_{PFEF}$ is indicative of a voltage at point $P_F$ with respect to a terminal $E_F$ shown in FIG. 7. The voltage $V_{PFEF}$ is generated by switching of the switching units $S_{F1}$ and $S_{F2}$.

Similarly, the voltage $V_{AFEF}$ is indicative of a voltage at point $A_F$ with respect to the terminal $E_F$ shown in FIG. 7. The voltage $V_{AFEF}$ is generated by switching of the switching units $S_{F3}$ and $S_{F4}$. The voltages $V_{PFEF}$ and $V_{AFEF}$ have a switching period represented by $T_s$. Further, the switching frequency of the voltages $V_{PFEF}$ and $V_{AFEF}$ is represented by $f_{sw}$. The output voltage $V_F$ generated by the second converter 114 is equal to ($V_{PFEF}-V_{AFEF}$).

The output voltage $V_F$ includes a low frequency (LF) component and a high frequency filter component. The time period of the output voltage $V_F$ is represented by $0.5\times T_s$ which is equal to the time period of the output voltage $V_{in}$. The output voltage $V_F$ includes pulses 808 having an amplitude of $V_{DC}/2N$ during duration of time instant $t_{11}$ to time instant $t_{12}$ and during duration from time instant $t_{13}$ to time instant $t_{14}$. If N=1, then the amplitude of the pulses 808 is represented by $V_{DC}/2$. Further, the pulses 808 of the high frequency filter component are obtained at the first coil 306 shown in FIG. 3 and is represented by $V_{PRI}$.

Further, the high frequency filter component induced at the second coil 308 is represented by $V_{SEC1}$ and at the second coil 310 is represented by $V_{SEC2}$. If N=1, the amplitude of the voltages $V_{SEC1}$ and $V_{SEC2}$ is represented by $V_{DC}\times(1-D)/2$. The voltage $V_{SEC1}$ is substantially equal to voltage $V_{SEC2}$. The voltage $V_{SEC1}+V_{SEC2}$ is obtained across the two second coils 308, 310 due to mutual coupling of the second coils 308, 310. The pulses of the voltage $V_{SEC1}+V_{SEC2}$ are represented by reference numeral 810 and pulses 810 have an amplitude of $V_{DC}\times(1-D)$ during duration of time instant $t_{11}$ to time instant $t_{12}$ and during duration from time instant $t_{13}$ to time instant $t_{14}$. The pulses 606 of the high frequency noise components $V_{NOISE}$ are time aligned with respect to the pulses 810 of the voltage $V_{SEC1}+V_{SEC2}$. Particularly, the pattern and amplitude of the pulses 810 is substantially same as the pattern of pulses 606. Hence, the pulses 810 facilitate to cancel the high frequency noise components $V_{NOISE}$ represented by the pulses 606. The filtered electrical output $V_{out}$ is substantially free of any high frequency harmonics/ripples since the high frequency noise components $V_{NOISE}$ are cancelled.

Figure 9:
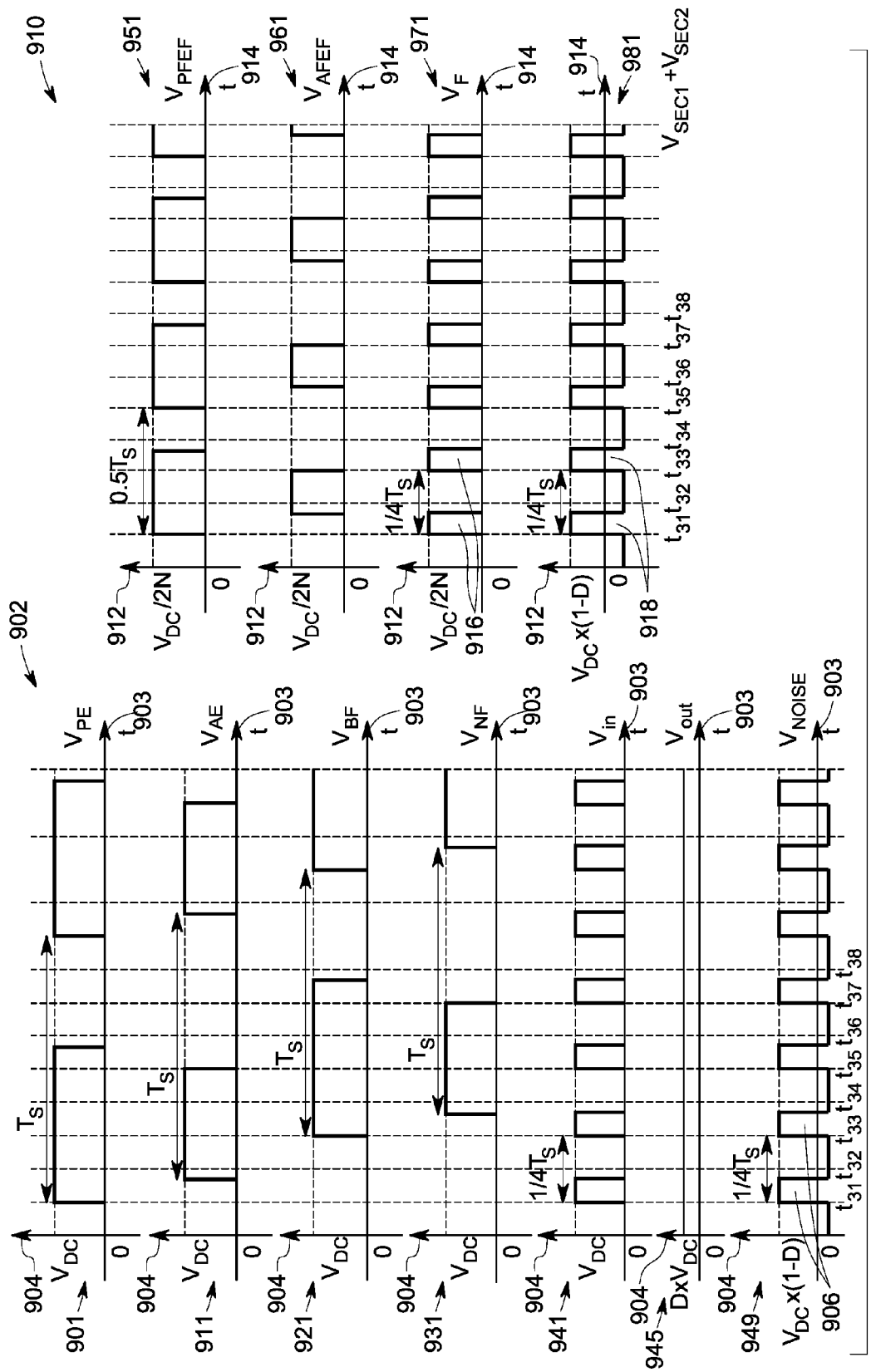
FIG. 9 is a waveform representation of a plurality of electrical parameters of a system used for filtering high frequency noise components generated by a power conversion unit in accordance with another embodiment of the present invention.

FIG. 9 is a waveform representation of a plurality of electrical parameters of the system 100 in accordance with the embodiment of FIG. 7. The first converters 108 and the second converter 114 are switched based on a regular PWM technique. Further, the first converters 108 are switched based on a frequency $f_{sw}$ and the second converter 114 is switched based on a frequency $2\times f_{sw}$.

The waveform representation 902 includes x-axis 903 indicative of time in seconds and y-axis 904 amplitude in volts. Further, the waveform representation 902 includes the plurality of waveforms 901, 911, 921, 931, 941, 945, 949 of the electrical parameters of the two first converters 108. The waveforms 901, 911, 921, 931, 941, 945, and 949 represent voltages $V_{PE}$, $V_{AE}$, $V_{BF}$, $V_{NF}$, $V_{in}$, $V_{out}$, and $V_{NOISE}$, respectively that are generated due to the switching of the first converters 108. The voltage $V_{PE}$ is indicative of a voltage at point P with respect to terminal E shown in FIG. 7. The voltage $V_{PE}$ is generated by switching of the switching units $S_1$ and $S_2$. Similarly, the voltage $V_{AE}$ is indicative of a voltage at point A with respect to terminal E shown in FIG. 7. The voltage $V_{AE}$ is generated by switching of the switching units $S_3$ and $S_4$. In a similar manner, the voltage $V_{BF}$ is indicative of a voltage at point B with respect to terminal F shown in FIG. 7. The voltage $V_{BF}$ is generated by switching of the switching units $S_5$ and $S_6$. Similarly, the voltage $V_{NF}$ is indicative of a voltage at point N with respect to terminal F shown in FIG. 7. The voltage $V_{NF}$ is generated by switching of the switching units $S_7$ and $S_8$. The voltages $V_{PE}$, $V_{AE}$, $V_{BF}$, and $V_{NF}$ have a switching period represented by $T_s$. Further, the switching frequency of the voltages $V_{PE}$, $V_{AE}$, $V_{BF}$ and $V_{NF}$ is represented by $f_{sw}$. The output voltage $V_{in}$ generated by the first converters 108 is equal to $(V_{PE}-V_{AE})+(V_{BF}-V_{NF})$.

In the illustrated embodiment, the output voltage $V_{in}$ includes high frequency noise components $V_{NOISE}$ and a filtered electrical output $V_{out}$. The time period of the output voltage $V_{in}$ is represented by $0.25 \times T_s$. The amplitude of the filtered electrical output $V_{out}$ is $D \times V_{DC}$. The high frequency noise components $V_{NOISE}$ are represented by pulses 906 having an amplitude of $V_{DC} \times (1-D)$, during time duration from time instant tai to time instant $t_{32}$, time instant $t_{33}$ to time instant $t_{34}$, time instant $t_{35}$ to time instant $t_{36}$, and time instant $t_{37}$ to time instant $t_{38}$.

The waveform representation 910 includes y-axis 912 indicative of amplitude in volts and x-axis 914 indicative of time in seconds. Further, the waveform representation 902 includes the plurality of waveforms 951, 961, 971, and 981 of the electrical parameters of the filtering unit 104. The waveforms 951, 961, 971, and 981 represent voltages $V_{PFEF}$, $V_{PFEF}$, $V_F$, and $V_{SEC1}+V_{SEC2}$ that are generated due to the switching of the second converter 114. The voltage $V_{PFEF}$ is indicative of a voltage at point $P_F$ with respect to terminal $E_F$ shown in FIG. 7. The voltage $V_{PFEF}$ is generated by switching of the switching units $S_{F1}$ and $S_{F2}$. Similarly, the voltage $V_{PFEF}$ is indicative of a voltage at point $A_F$ with respect to terminal $E_F$ shown in FIG. 7. The voltage $V_{PFEF}$ is generated by switching of the switching units $S_{F3}$ and $S_{F4}$. The voltages $V_{PFEF}$ and $V_{PFEF}$ have a switching period represented by $0.5 \times T_s$. Further, the switching frequency of the voltages $V_{PFEF}$ and $V_{AFEF}$ is represented by $2 \times f_{sw}$. The output voltage $V_F$ generated by the second converter 114 is equal to $(V_{PFEF}-V_{AFEF})$.

The output voltage $V_F$ includes a low frequency (LF) component and a high frequency filter component. The time period of the output voltage $V_F$ is represented by $0.25 \times T_s$ which is equal to time period of the output voltage $V_{in}$. The output voltage $V_F$ includes pulses 916 having an amplitude of $V_{DC}/2N$ during the time duration from time instant $t_{31}$ to time instant $t_{32}$, the time instant $t_{33}$ to time instant $t_{34}$, the time instant $t_{35}$ to time instant $t_{36}$, and the time instant $t_{37}$ to time instant $t_{38}$. If N=1, then the amplitude of pulses 916 is represented by $V_{DC}/2$. Further, the pulses 916 representative of the high frequency filter component are obtained at the first coil 306 of FIG. 3 and is represented by $V_{PRI}$.

Further, the high frequency filter component induced at the second coil 308 is represented by $V_{SEC1}$ and at the second coil 310 is represented by $V_{SEC2}$. If N=1, the amplitude of the voltages $V_{SEC1}$ and $V_{SEC2}$ is represented by $V_{DC} \times (1-D)/2$. The voltage $V_{SEC1}$ is substantially equal to voltage $V_{SEC2}$. The voltage $V_{SEC1}+V_{SEC2}$ is obtained across the two second coils 308, 310 due to mutual coupling of the second coils 308, 310. The pulses of the voltage $V_{SEC1}+V_{SEC2}$ are represented by reference numeral 918 and pulses 918 have an amplitude of $V_{DC} \times (1-D)$ during the time duration from time instant tai to time instant $t_{32}$, the time instant $t_{33}$ to time instant $t_{34}$, the time instant $t_{35}$ to time instant $t_{36}$, and the time instant $t_{37}$ to time instant $t_{38}$. The pattern and amplitude of the pulses 918 may be substantially same as the pattern of pulses 906. As a result, the pulses 918 facilitate to cancel the high frequency noise components $V_{NOISE}$ represented by the pulses 906. The filtered electrical output $V_{out}$ is substantially free of any high frequency harmonics/ripples since the high frequency noise components $V_{NOISE}$ are cancelled.

Figure 10:
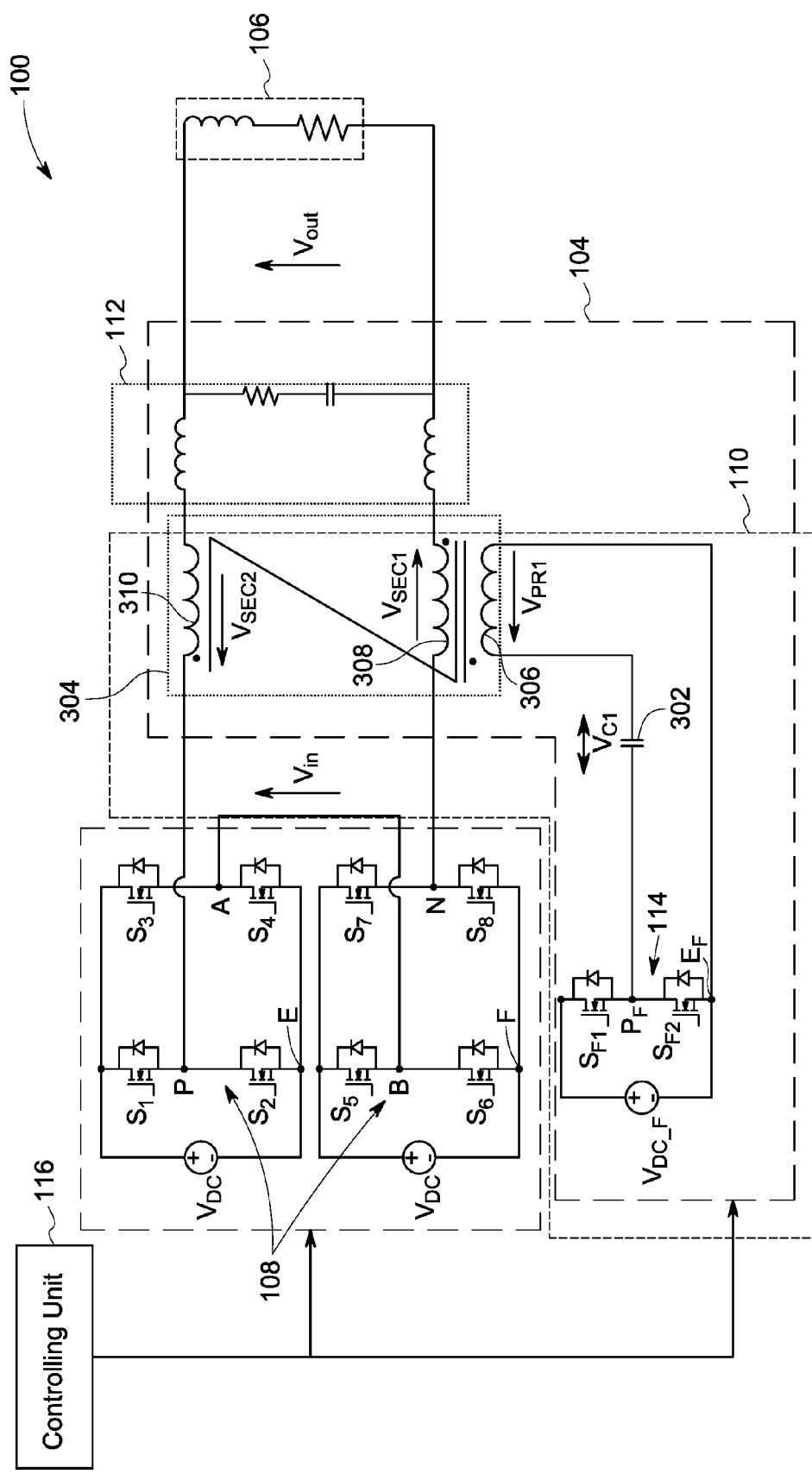
FIG. 10 is a diagrammatical representation of yet another embodiment of a system used for filtering high frequency noise components generated by a power conversion unit.

Turning now to FIG. 10, a diagrammatical representation of another embodiment of a system 100. The system 100 includes two first converters 108, the filtering unit 104, and the load 106. The two first converters 108 include a plurality of switching units represented by $S_1$, $S_2$, $S_3$, $S_4$, $S_5$, $S_6$, $S_7$, and $S_8$. An isolated input voltage having magnitude $V_{DC}$ is provided at the input of each first converters 108.

Further, the filtering unit 104 includes the active filter subunit 110 and the high frequency passive filter 112. The active filter subunit 110 is coupled to the high frequency passive filter 112. The active filter subunit 110 includes the second converter 114, the blocking capacitor 302, and the plurality of inductors 304. The second converter 114 is a half bridge converter having only one phase leg, where the phase leg includes two switching units represented by $S_{F1}$ and $S_{F2}$.

The system 100 further includes a controlling unit 116 for determining switching technique and switching frequency of the first converters 108 and the second converters 114. In one embodiment, the switching units of the first converters 108 and the second converter 114 are switched at a substantially same frequency or different frequency. An output voltage $(V_{in})$ generated by the first converters 108 and an output voltage $(V_F)$ generated by the second converter 114 have substantially same switching pattern.

Figure 11:
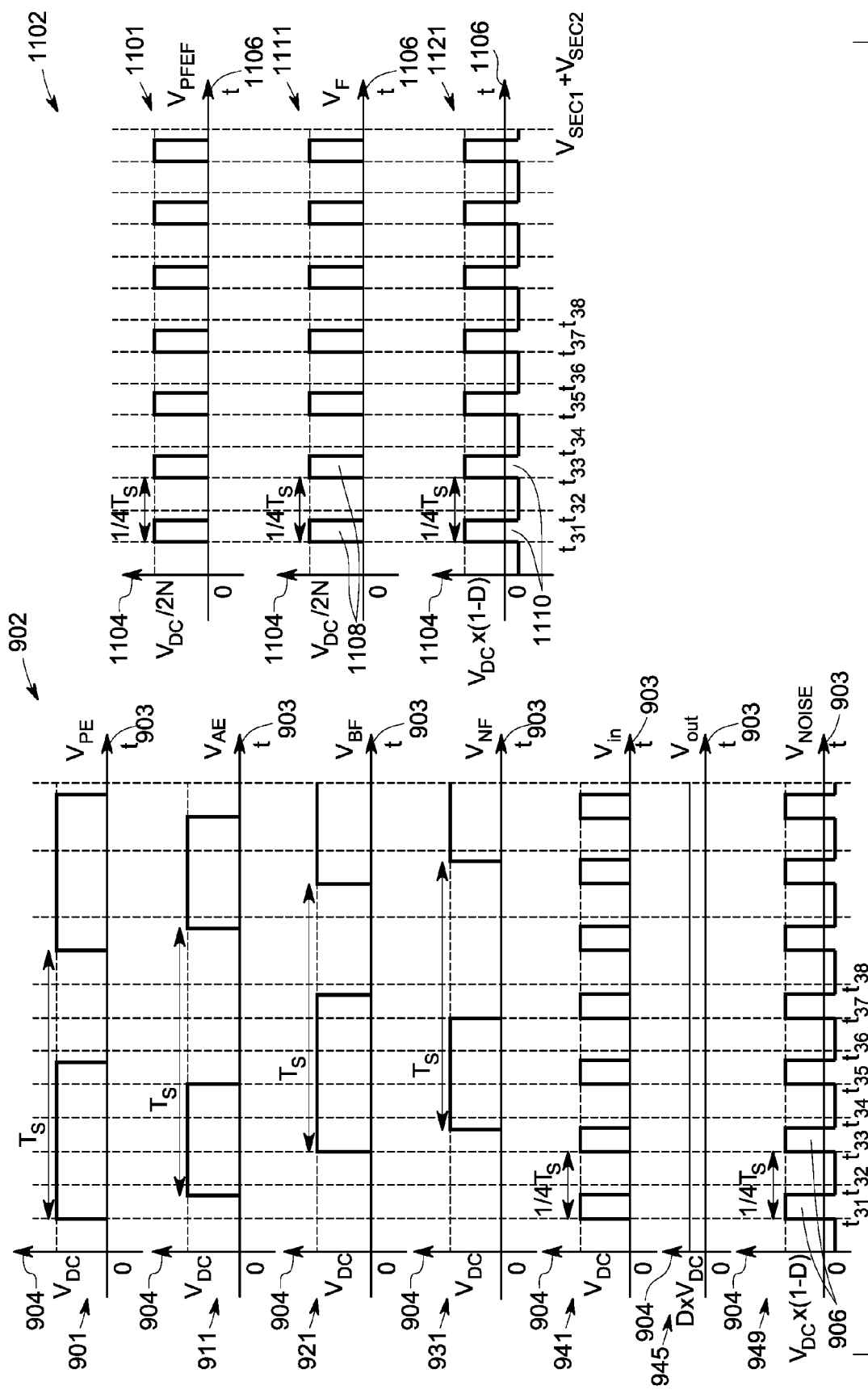
FIG. 11 is a waveform representation of a plurality of electrical parameters of the system used for filtering high frequency noise components generated by the power conversion unit in accordance with the embodiment of FIG. 10.

FIG. 11 is a waveform representation of a plurality of electrical parameters of the system 100 in accordance with the embodiment of FIG. 10. The first converters 108 and the second converter 114 are switched based on a regular PWM technique. Further, the first converters 108 are switched based on a frequency $f_{sw}$ and the second converter 114 is switched based on a frequency $4 \times f_{sw}$.

The waveform representation 902 includes x-axis 903 indicative of time in seconds and y-axis 904 indicative of amplitude in volts. Further, the waveform representation 902 includes the plurality of waveforms 901, 911, 921, 931, 941, 945, 949 of the electrical parameters of the two first converters 108. The waveforms 901, 911, 921, 931, 941, 945, and 949 represent voltages $V_{PE}$, $V_{AE}$, $V_{BF}$, $V_{NF}$, $V_{in}$, $V_{out}$, and $V_{NOISE}$, respectively, that are generated due to the switching of the first converters 108. The voltages $V_{PE}$, $V_{AE}$, $V_{BF}$, and $V_{NF}$ have a switching period represented by $T_s$. Further, the switching frequency of the voltages $V_{PE}$, $V_{AE}$, $V_{BF}$ and $V_{NF}$ is represented by $f_{sw}$. The output voltage $V_{in}$ generated by the first converters 108 is equal to $(V_{PE}-V_{AE})+(V_{BF}-V_{NF})$.

In the illustrated embodiment, the output voltage $V_{in}$ includes high frequency noise components $V_{NOISE}$ and a filtered electrical output $V_{out}$. The time period of the output voltage $V_{in}$ is represented by $0.25 \times T_s$. The amplitude of the filtered electrical output $V_{out}$ is $D \times V_{DC}$. The high frequency noise components $V_{NOISE}$ are represented by the pulses 906 and the pulses 906 have an amplitude $V_{DC} \times (1-D)$ during the time duration from time instant $t_{31}$ to time instant $t_{32}$, the time instant $t_{33}$ to time instant $t_{34}$, the time instant $t_{35}$ to time instant $t_{36}$, and the time instant $t_{37}$ to time instant $t_{38}$.

The waveform representation 1102 includes y-axis 1104 indicative of amplitude in volts and x-axis 1106 indicative of time in seconds. Further, the waveform representation 1102 includes the plurality of waveforms 1101, 1111, 1121 of the electrical parameters of the second converter 114. The waveforms 1101, 1111, and 1121 represent voltages $V_{PFEF}$, $V_F$, and $V_{SEC1}+V_{SEC2}$, respectively generated due to the switching of the second converter 114. The voltage $V_{PFEF}$ is generated by switching of the switching units $S_{F1}$ and $S_{F2}$. The switching frequency of the voltage $V_{PFEF}$ is represented by $4 \times f_{sw}$. The output voltage $V_F$ generated by the second converters 114 is equal to the voltage $V_{PFEF}$.

In the illustrated embodiment, the output voltage $V_F$ includes a low frequency (LF) component and a high frequency filter component. The time period of the output voltage $V_F$ is represented by $0.25 \times T_s$ which is equal to a time period of the output voltage $V_{in}$. The high frequency filter component is represented by the pulses 1108 having an amplitude of $V_{DC}/2N$ during the time duration from time instant $t_{31}$ to time instant $t_{32}$, the time instant $t_{33}$ to time instant $t_{34}$, the time instant $t_{35}$ to time instant $t_{36}$, and the time instant $t_{37}$ to time instant $t_{38}$. If N=1, then the amplitude of the pulses 1108 is represented by $V_{DC}/2$. Further, the pulses 1108 representative of the high frequency filter component are obtained at the first coil 306 of FIG. 3 and is represented as $V_{PRI}$.

Further, the high frequency filter component induced at the second coil 308 is represented by $V_{SEC1}$ and at the second coil 310 is represented by $V_{SEC2}$. If N=1, the amplitude of the voltages $V_{SEC1}$ and $V_{SEC2}$ is represented by $V_{DC} \times (1-D)/2$. The voltage $V_{SEC1}$ is substantially equal to voltage $V_{SEC2}$. The voltage $V_{SEC1}+V_{SEC2}$ is obtained across the two second coils 308, 310 due to mutual coupling of the second coils 308, 310. The pulses of the voltage $V_{SEC1}+V_{SEC2}$ are represented by reference numeral 1110 and pulses 1110 have an amplitude of $V_{DC} \times (1-D)$ during the time duration from time instant $t_{31}$ to time instant $t_{32}$, the time instant $t_{33}$ to time instant $t_{34}$, the time instant $t_{35}$ to time instant $t_{36}$, and the time instant $t_{37}$ to time instant $t_{38}$. The pattern and amplitude of the pulses 1110 is substantially same as the pattern of pulses 906. The pulses 1110 facilitate to cancel the high frequency noise components $V_{NOISE}$ represented by pulses 906. The filtered electrical output $V_{out}$ is substantially free of any high frequency harmonics/ripples since the high frequency noise components $V_{NOISE}$ are cancelled.

In accordance with embodiments discussed herein, the process steps may be implemented by suitable code on a processor-based system such as a general-purpose or special-purpose computer. It should also be noted herein that some or all of the steps described herein may be performed in different orders or substantially concurrently. Furthermore, the functions may be implemented in a variety of programming languages including but not limited to C++ or Java. Such code may be stored or adapted for storage on one or more tangible, machine readable media such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

In accordance with the embodiments discussed herein, the exemplary system facilitates to reduce high frequency noise components in a power conversion system. Furthermore, the system includes an active filter, thereby reducing number and size of passive components. Therefore, the size and losses in the system are substantially reduced.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A system comprising:
   at least one first converter;
   a filtering unit coupled to the at least one first converter, wherein the filtering unit comprises:
      at least one second converter; and
      a plurality of inductors coupled to the at least one second converter; and
   a controlling unit operatively coupled to the at least one first converter and the at least one second converter, wherein the controlling unit switches the at least one first converter to generate a first output voltage and the at least one second converter to generate a second output voltage, and wherein the first output voltage and the second output voltage have a substantially same switching pattern.

2. The system of claim 1, wherein the controlling unit switches the at least one first converter at a first frequency and the at least one second converter at a second frequency, and wherein the first frequency and the second frequency have a same measurement unit.

3. The system of claim 2, wherein the first frequency is half of the second frequency.

4. The system of claim 2, wherein the first frequency is twice of the second frequency.

5. The system of claim 1, wherein the filtering unit further comprises a blocking capacitor coupled to the at least one second converter and at least one of the plurality of inductors.

6. The system of claim 1, wherein the plurality of inductors comprises a first coil and at least one second coil operatively coupled to the first coil.

7. The system of claim 1, wherein the at least one first converter is operatively coupled to a load via the filtering unit.

8. The system of claim 7, wherein the filtering unit further comprises a high frequency passive filter coupled to the at least one first converter and the load.

9. The system of claim 1, wherein the filtering unit is a high pass active filter.

10. The system of claim 1, wherein the filtering unit reduces a high frequency noise component generated by the at least one first converter.

11. The system of claim 1, wherein at least one of the at least one first converter and the at least one second converter comprises a plurality of switching units.

12. The system of claim 11, wherein at least one of the plurality of switching units comprises a controllable semiconductor switch.

13. An imaging system comprising:
   a gradient amplifier comprising:
      at least one first converter;
      a filtering unit coupled to the at least one first converter, wherein the filtering unit comprises:
         at least one second converter; and
         a plurality of inductors coupled to the at least one second converter;

a gradient coil coupled to the gradient amplifier via the filtering unit; and a controlling unit operatively coupled to the at least one first converter and the at least one second converter, wherein the controlling unit switches the at least one first converter to generate a first output voltage and the at least one second converter to generate a second output voltage, and wherein the first output voltage and the second output voltage have a substantially same switching pattern.

14. The imaging system of claim 13, wherein the filtering unit comprises a blocking capacitor coupled to the at least one second converter and the plurality of inductors.

15. The imaging system of claim 13, wherein the filtering unit is a high pass active filter.

16. The imaging system of claim 13, wherein the filtering unit reduces a high frequency noise component generated by the at least one first converter.

17. The imaging system of claim 13, wherein the plurality of inductors comprises a first coil and at least one second coil operatively coupled to the first coil.

18. The imaging system of claim 13, wherein the filtering unit provides a filtered electrical output to the gradient coil.

19. A method comprising:

switching, using a controlling unit, at least one first converter and at least one second converter of a filtering unit to generate a first output voltage and a second output voltage respectively, wherein the first output voltage and the second output voltage have a substantially same switching pattern, and wherein the filtering unit comprises a plurality of inductors coupled to the at least one second converter;

generating a filtering component, using the filtering unit, based on the generated second output voltage;

subtracting the filtering component from the generated first output voltage;

generating a filtered electrical output based on the subtraction of the filtering component from the generated first output voltage; and providing the filtered electrical output to a load operatively coupled to the at least one first converter.

20. The method of claim 19, wherein the first output voltage further comprises a high frequency noise component.

21. The method of claim 20, wherein subtracting the filtering component from the generated first output voltage reduces the high frequency noise component.

22. The method of claim 19, wherein switching the at least one first converter and the at least one second converter comprises switching at least one of a plurality of switching units of at least one of the at least one first converter and the at least one second converter at a substantially same switching frequency.

* * * * *